United States Patent [19]
Sakaguchi

[11] Patent Number: 5,697,679
[45] Date of Patent: Dec. 16, 1997

[54] ANTI-LOCK CONTROL COMPUTER MALFUNCTION DETECTING DEVICE

[75] Inventor: Masahiro Sakaguchi, Itami, Japan

[73] Assignee: Sumitomo Electric Industries, Ltd., Osaka, Japan

[21] Appl. No.: 561,330

[22] Filed: Nov. 21, 1995

[30] Foreign Application Priority Data

Dec. 5, 1994 [JP] Japan .................................. 6-300550

[51] Int. Cl.$^6$ .................................................. C06F 11/30
[52] U.S. Cl. .................. 303/122.06; 303/122.07; 303/156; 303/174
[58] Field of Search .................. 303/122.06, 122.07, 303/194, 195

[56] References Cited

U.S. PATENT DOCUMENTS 4,092,853  6/1978  Schneider et al. .................. 303/122.06
4,876,527  10/1989  Oka et al. .................. 303/122.06
5,476,311  12/1995  Fennel et al. .................. 303/122.06

FOREIGN PATENT DOCUMENTS

193335  9/1986  European Pat. Off. .......... 303/122.07

*Primary Examiner*—Matthew C. Graham
*Attorney, Agent, or Firm*—Greenblum & Bernstein P.L.C.

[57] ABSTRACT

An anti-lock controller is used in an anti-lock control system for detecting a locked condition of a wheel of a vehicle based on wheel rotation speed signal which are pulse signals. The anti-lock controller is provided with a malfunction detector constructed by a soft ware. This malfunction detector includes an interrupt detection function to produce an interrupt signal on receipt of the pulse signal. At the same time, the controller suspends current operations and transfers control thereof to a routine for detecting the locked condition of the wheel. A malfunction determination function is prepared for determining that the anti-lock controller malfunctions when the interrupt signal is absent with a detection of the pulse signal.

19 Claims, 9 Drawing Sheets

ANTI-LOCK CONTROL COMPUTER MALFUNCTION DETECTING DEVICE

BACKGROUND OF THE INVENTION

1. Field of the Invention

The present invention relates to an anti-lock control computer malfunction detecting device for use in an anti-lock (skid) brake control system, and is particularly suitable for detecting the malfunction of a micro computer which determines the anti-lock operation to control the brake fluid pressure of the vehicle based on the locked condition of wheels.

2. Description of the Prior Art

Figure 8:
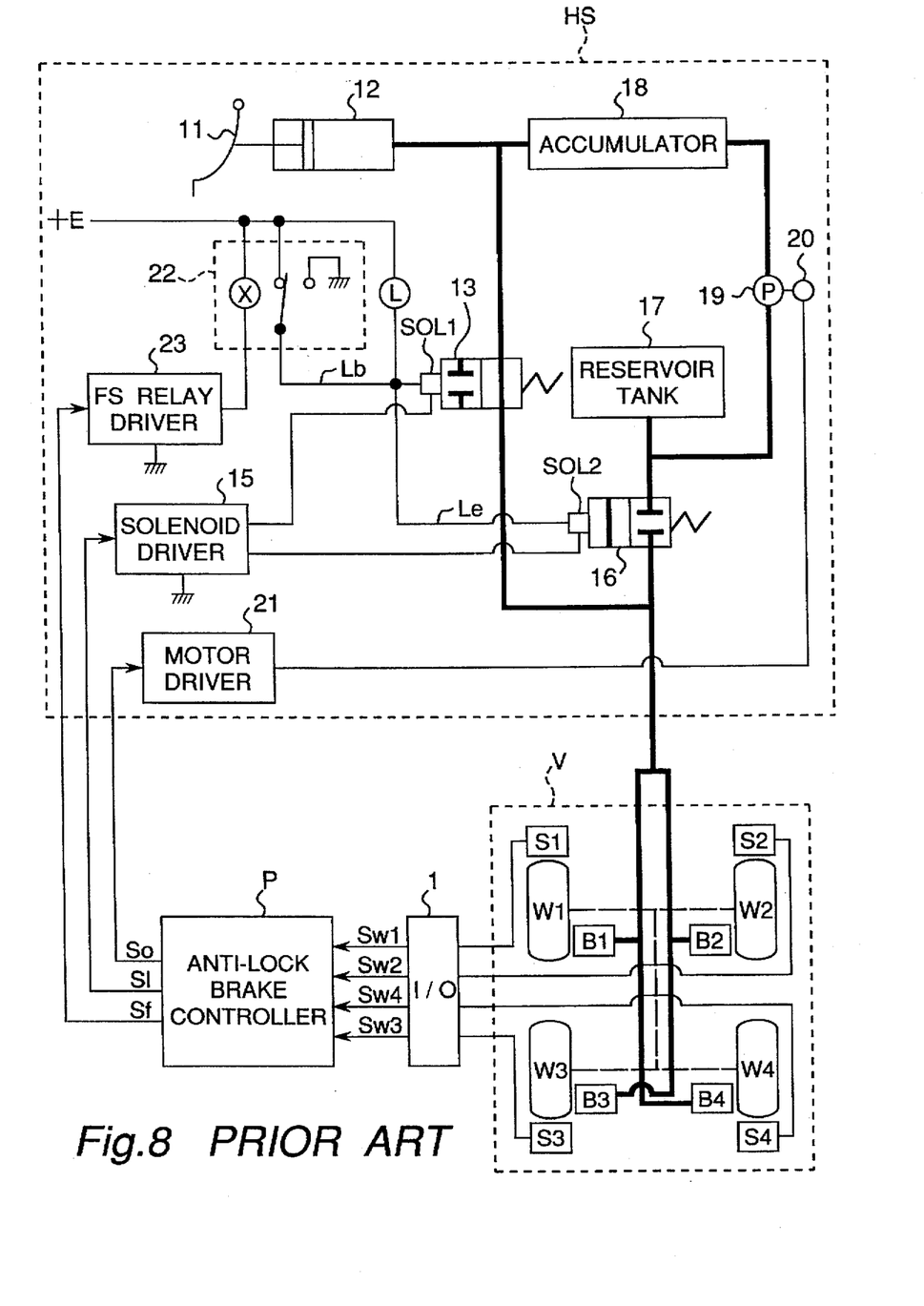
FIG. 8 is a block diagram showing a conventional anti-lock brake control system.

In FIG. 8, an anti-lock (skid) brake control system (ABS) of a fluid circulation type used in a vehicle V for controlling the braking operation of wheels W1, W2, W3, and W4 is shown. The ABS has a hydraulic system HS for producing a brake pressure applied to each of brake cylinders B1, B2, B3, and B4 of the vehicle V. The ABS further has an anti-lock brake controller P for controlling the hydraulic system HS based on signals Sw1, Sw2, Sw3, and Sw4 from wheel speed sensors S1, S2, S3, and S4, through an I/O 1, provided to wheels W1, W2, W3, and W4, respectively.

The anti-lock brake controller P performs various computations and judgements based on signals Sw1, Sw2, Sw3, and Sw4 to detect the conditions of each wheel, locked or unlocked. According to thus detected wheel conditions, the anti-lock brake controller P produces control signals So, Sl, and Sf for controlling the hydraulic system HS to apply a controlled fluid pressure to each of brake cylinders B1, B2, B3, and B4 of the vehicle V properly.

Figure 9:
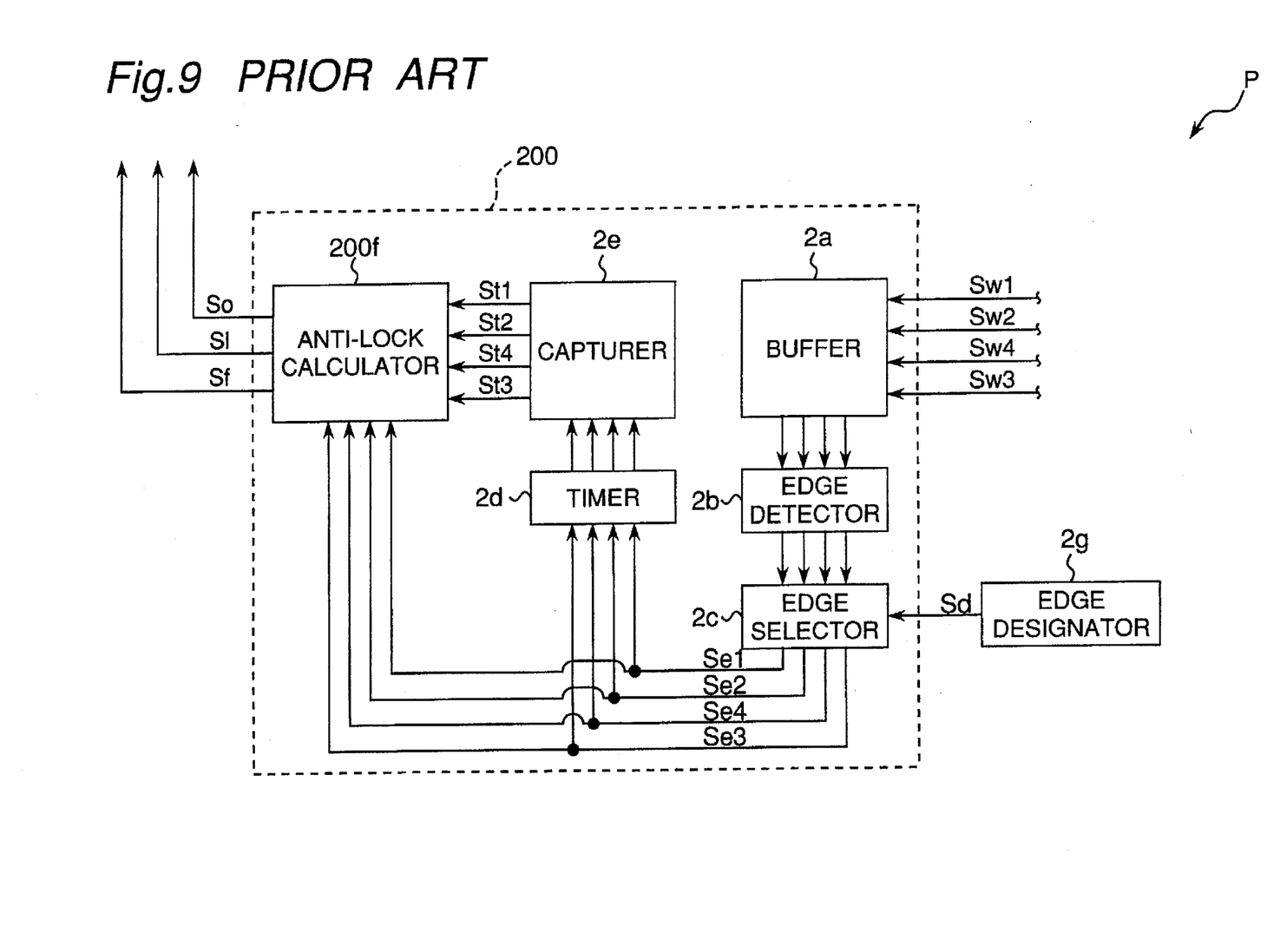
FIG. 9 is a block diagram showing a conventional anti-lock controller used the anti-lock brake control system of FIG. 8.

As shown in FIG. 9, the anti-lock brake controller P includes an anti-lock control unit 200 that is comprised of a buffer storage 2a, an edge detector 2b, an edge selector 2c, a timer 2d, a capturer 2e, and an anti-lock calculator 200f that are connected to each other. The buffer storage 2a latches the wheel speed signals Sw1, Sw2, Sw3, and Sw4 from the I/O 1 (FIG. 8).

With respect to each of thus latched wheel speed signals Sw1, Sw2, Sw3, and Sw4, the edge detector 2b detects both or either leading edges and trailing edges. Among thus detected edges, the edge selector 2c selectively detects either leading and trailing edges based on an edge designation signal Sd produced by an edge designator 2g provided externally.

With respect to each of wheel speed signals Sw1, Sw2, Sw3, and Sw4, the edge selector 2c produces edge selection signals Se1, Se2, Se3, and Se4, respectively, every time when the designated edge is detected. On receipt of these edge selection signals Se1, Se2, Se3, and Se4, the timer 2d detects each time when designated edges are detected. Furthermore, the capturer 2e produces time signals St1, St2, St3, and St4 indicative of such designated edge detection time, respectively.

The anti-lock calculator 200f receives the edge selection signal Se1, Se2, Se3, and Se4 as interrupt signals and time signals St1, St2, St3, and St4. Based on each pair of time and edge selection signals, the anti-lock calculator 200f calculates actual wheel speeds V1, V2, V3, and V4 indicating the actual rotating speed of wheels W1, W2, W3, and W4, respectively. Based on these calculated actual wheel speeds V1, V2, V3, and V4, the anti-lock calculator 200f detects the locking state of wheels as follows.

For example, the anti-lock calculator 200f calculates an average value of the greatest and the second greatest ones of these four actual wheel speeds V1, V2, V3, and V4, and obtains a control reference speed Vs used as a reference velocity for the anti-lock brake control operation. When any of actual wheel speeds V1, V2, V3, and V4 exceeds the reference speed Vs, it is judged that the corresponding wheel is locked. According to thus detected locking condition of wheel(s), the anti-lock calculator 200f further produces the lock detection signal Sl, the fluid circulation signal So, and the fail safe signal Sf.

When the hydraulic system in the state as shown in FIG. 8, pressing down a brake pedal 11 causes a brake fluid inside a master cylinder 12 is supplied to brake cylinders B1, B2, B3, and B4 through a pressure control valve 13 which is normally opened. Then, each brake cylinder reduces the rotation of wheels to brake the vehicle V. When the anti-lock controller 200f detects that any of wheels W1, W2, W3, and W4 is locked, the lock detection signal Sl becomes "HIGH".

On receipt of this HIGH level signal Sl, a solenoid driver 15 energizes solenoids SOL1 and SOL2. The pressure valve 13, which is normally opened, closes a brake fluid supply path extending from a fluid pressure source constructed by the master cylinder 12 and an accumulator 18. A pressure control valve 16, which is normally closed, opens a fluid discharge path (depicted in FIG. 7). As a result, a brake fluid in the brake cylinders B1, B2, B3, and B4 flaws into a reservoir tank 17, and the brake fluid pressure in the brake cylinders B1, B2, B3, and B4 reduces. At the same time, one input terminal of each of solenoids SOL1 and SOL2 is grounded by a relay switch 22 which is normally closed. Further more, a warning lamp L will gets lit.

Corresponding to this pressure reduction, the fluid circulation signal So transferred from the anti-lock brake controller P to the motor driver 21 turns "HIGH" level. On receipt of this HIGH level signal So, the motor driver 21 runs the motor 20 so that a pump 19 sucks the brake fluid in the brake cylinders B1, B2, B3, and B4 and the reservoir tank 17, and returns the sucked brake fluid to the fluid supply side. Thus, the brake fluid is circulated inside the hydraulic system HS.

However, when the wheel speed indicative of a locking symptom is improved by the fluid pressure reduction, the difference between the reference speed and the actual wheel speed(s) becomes smaller than the predetermined value. In this case, the anti-lock brake controller P judges that the wheel(s) is released from the locked state, and turns the solenoid signal Sl to "LOW" level. On receipt of this "LOW" level signal Sl, the solenoid driver 15 releases the solenoids SOL1 and SOL2. As a result, the pressure control valves 13 and 17 return to the normal condition, as depicted in FIG. 8, and are ready for increasing the brake pressure generated by pressing the brake pedal 11.

According to the anti-lock (skid) brake control system using a micro computer such as the anti-lock calculator 200f especially, it is necessary to cancel the anti-lock brake control when the micro computer itself or anti-lock control unit 200 is out of order. For example, a computer malfunctions such as being in a thermal run away or having internal elements broken that can not perform its operation properly. In these occasions, it is needless to say that the anti skid brake control can not be performed properly. To make matters worse, the driver in the vehicle under the such the control of such a malfunctioned computer puts his life in hazard.

Therefore, a fail safe system is essentially provided for preventing a vehicle driver from being in such a hazardous situation due to the malfunction of the anti-lock control unit 200 or the calculator 200f. The fail safe system includes a fail safe relay 22 and fail safe relay driver 23 for driving the relay 22 based on the fail safe signal Sf from the anti-lock brake controller P (FIG. 9). The anti-lock brake controller P turns the fail safe signal Sf to "HIGH" level when it is detected that the micro computer such as anti-lock calculator 200f incorporated therein is out of order or malfunctioning.

On receipt of this HIGH level signal Sf, the fail safe relay 22 makes the contact, which is normally closed, to open. As result, both the solenoids SOL1 and SOL2 are fixed to the opened state even when the solenoid driver 15 tries to energize them based on the HIGH level solenoid signal Sl. Thus, the anti-lock brake control by such malfunctioning controller can be prevented.

However, according to thus constructed anti-lock brake controller P, it is impossible to calculate the actual wheel speeds V1, V2, V3, and V4 based on the wheel speed signals Sw1, Sw2, Sw3, and Sw4 if only any of buffer storage 2a, edge detector 2b, edge selector 2c, timer 2d, and capturer 2e is disordered. Under such situations, the anti-lock brake controller P or the calculator 200f detects the wheel locked state in spite of that no wheel is locked during braking operation by the driver, and then turns the lock detection signal So to "HIGH". Thus, the braking pressure applied to the brake cylinders B1, B2, B3, and B4 is reduced in the anti-lock brake controlled manner as described in the above, disabling the driver from controlling the running speed of the vehicle. Furthermore, what is worse is that the vehicle V may spin even if any of wheels W1, W2, W3, and W4 is locked, putting the driver into the hazardous situation.

SUMMARY OF THE INVENTION

The object of the present invention is therefore to provide an improved anti-lock controller which solves these problems.

In order to achieve the aforementioned objective, an anti-lock controller for detecting a locked condition of at least one wheel of a vehicle based on a pulse signal indicating a rotating speed of said wheel comprises an interrupt detection means for receiving said pulse signal to produce an interrupt signal to suspend current operations and transfer control of said anti-lock controller to a routine for detecting the locked condition of said wheel; and a malfunction determination means for determining that said anti-lock controller malfunctions when said interrupt signal is absent with a detection of said pulse signal.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENTS

Figure 1:
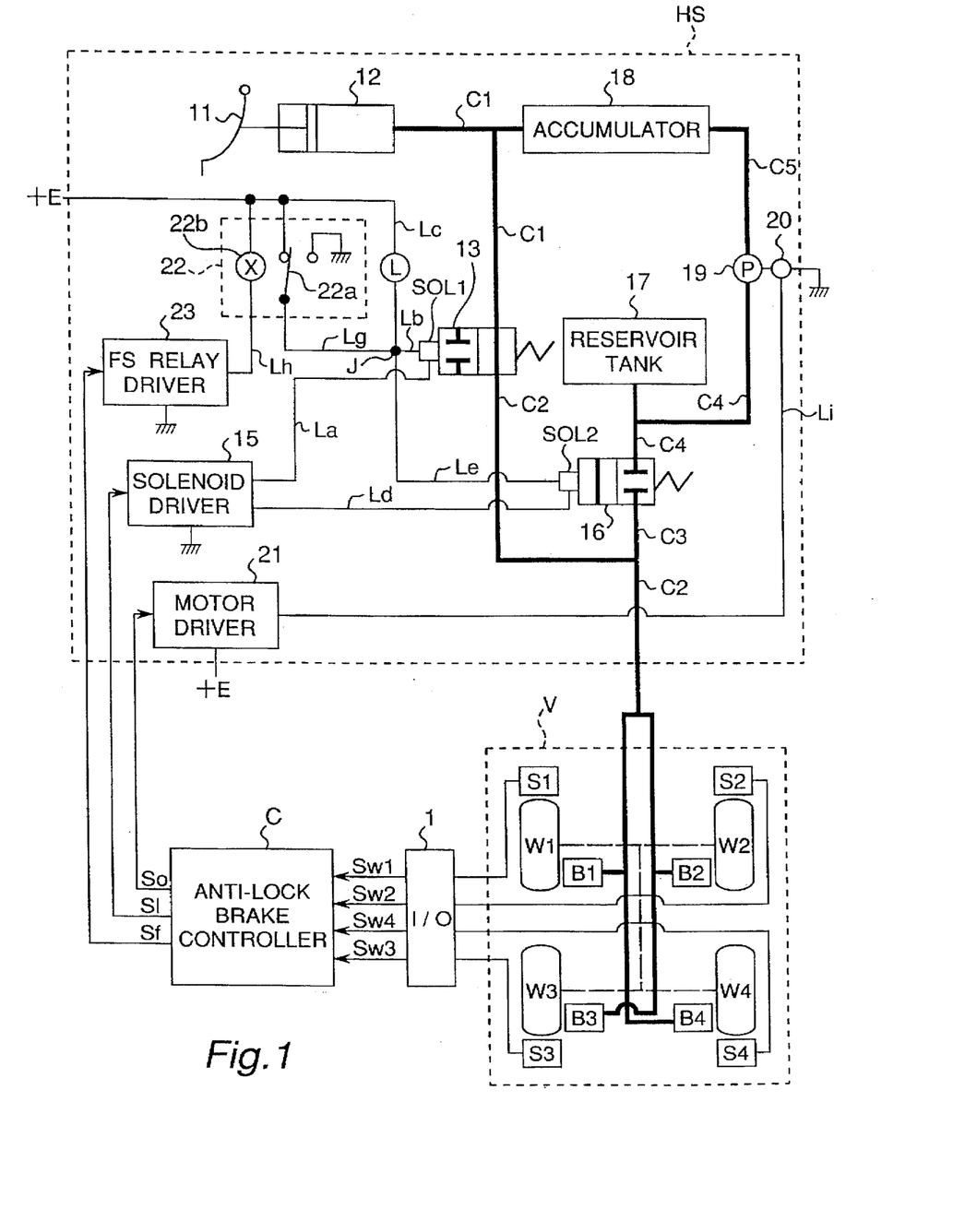
FIG. 1 is a block diagram showing an anti-lock brake control system wherein an anti-lock brake controller with an anti-lock control computer malfunction detecting device according to an embodiment of the present invention is incorporated.

Referring to FIG. 1, an anti-lock control computer malfunction detection device according to a preferred embodiment of the present invention used in an anti-lock (skid) brake control system (referred to as "ABS") is shown. In this embodiment, the ABS is installed in, for example, a vehicle V having four wheels W1, W2, W3, and W4 whose rotating speeds are detected by wheel speed sensors S1, S2, S3, and S4, respectively, and are braked by means of brake cylinders B1, B2, B3, and B4, respectively.

The ABS includes a hydraulic system HS, an I/O 1, and an anti-lock brake controller C. The hydraulic system HS generates a fluid pressure for pressurizing brake cylinders B1, B2, B3, and B4. The I/O 1 is connected to the wheel speed sensors S1, S2, S3, and S4 for receiving signals therefrom. Based on the signal from the sensor S1, the I/O produces a pulse signal indicative of rotating speed of wheel W1 as a wheel speed signal Sw1. Similarly, the wheel speed signals Sw2, Sw3, and Sw4 indicative of the rotating speed of wheels W2, W3, and W4, respectively, are produced.

The anti-lock brake controller C is connected to the I/O 1 for receiving the wheel speed signals Sw1, Sw2, Sw3, and Sw4 to detect respective wheel speeds. Based on thus detected wheel speeds, the anti-lock brake controller C detects a condition on which the wheel is locked conditions or not, and determines the operations of the hydraulic system HS. The anti-lock brake controller C further produces three signals So, Sl, and Sf for controlling the hydraulic system HS so as to apply the suitable fluid pressure to each brake cylinder. These signals So, Sl, and Sf are binary signals having two levels, "HIGH" and "LOW", and indicating either one of two levels. HIGH and LOW are also represented by "1" and "0", respectively.

The hydraulic system HS includes a brake master cylinder 12 which is operated by a driver with a brake pedal 11, an inlet valve 13 which is normally opened, an outlet valve 16 which is normally closed, a reservoir tank 17, a pump 19, a motor 20 which drives the pump 19 for circulating the fluid, and an accumulator 18. The pump 19 is also driving to generate a fluid pressure. The accumulator 18 can accumulate the fluid pressure thus generated by the master cylinder 12 and the pump 19.

The inlet valve 13 is a pressure control valve having a solenoid SOL1 for sliding a spool to close the fluid path thereof. The inlet valve 13 has an inlet port connected to an outlet port of the master cylinder 12 by a first fluid line C1, and an outlet port connected to each of brake cylinders B1, B2, B3, and B4 by a second fluid line C2.

The outlet valve 16 is a pressure control valve having a solenoid SOL2 for sliding a spool to open the fluid path thereof. The output valve 16 having an input port connected to each of brake cylinders B1, B2, B3, and B4 by third second fluid line C2, and having an output port connected to an input port of a hydraulic pump 19. Then the outlet valve 16 passes the fluid therethrough or not.

It is to be noted that the fluid pressure of brake cylinder B1, B2, B3, and B4 is controlled at the same time in the same manner in this example, since only a single hydraulic circuit is connected to all brake cylinders B1, B2, B3, and B4, as best shown in FIG. 1. However, it is needless to say that the anti-lock control computer malfunction detector can be applied to a anti-lock brake control system having plural hydraulic circuits each connected to one or more brake cylinders.

The reservoir tank 17 is connected to the output port of the outlet valve 16 and the input port of the pump 19 through the fourth fluid line C4. The reservoir tank 17 can temporarily store the brake fluid flowing through the outlet valve 16 when the hydraulic pump 19 is not driven.

The pump 19 also has an output port connected to the accumulator 18 by a fifth fluid line C5. The accumulator 18 is also connected to the first fluid line C1. The pump 19 is driven by the motor 20 to pump up the brake fluid from the reservoir tank 17 and/or the outlet valve 16 for returning the brake fluid to the first fluid line C1 through the accumulator 18.

The anti-lock brake control system utilizing this type of fluid circuit is referred to as "a fluid circulation type". The hydraulic system HS further includes a solenoid driver 15, a motor driver 21, a fail safe relay 22, and a fail safe driver 23.

The solenoid driver 15 has an input terminal connected to the anti-lock brake controller C for receiving the solenoid signal Sl therefrom. The solenoid driver 15 has two output terminals connected to the solenoids SOL1 and SOL2 by lines La and Ld, respectively. Both the solenoids SOL1 and SOL2 are further connected to a junction J by lines Lb and Le, respectively. The junction point J is connected to an electric power source +E having a predetermined voltage through a lamp L. Thus, each one end of solenoids SOL1 and SOL2 is applied with the electrical potential +E.

The electric power source +E is a secondary battery, mounted on the vehicle for example, having a predetermined electric potential such as 12V or 24V. When the solenoid signal Sl is HIGH, the solenoid driver 15 connects both the lines La and Ld to the ground to make the current to flow from the source +E through solenoids SOL1 and SOL2. Then, the solenoids SOL1 and SOL2 are energized to move the spools.

The fail safe relay 22 has a select switch 22a whose one end is connected to the junction J by a line Lg. The select switch 22a has another end selectively that can be connected to either one of the line Lc and the ground, but is normally connected to the line Lc (source +E). Thus, both the solenoids SOL1 and SOL2 are connected to the power source +E by two routes through the junction J. The first route is comprised of the lamp L and the second is of the fail safe relay 22. However, the lamp L has a greater resistance, almost all the current from the power source E+ is supplied to the solenoids SOL1 and SOL2 passing through the second route on the usual condition shown in FIG. 1. The fail safe relay 22 further has an electromagnet 22b connected to the output terminal of fail safe relay driver 23 by a line Lh and another end is connected to the line Lc.

Figure 7:
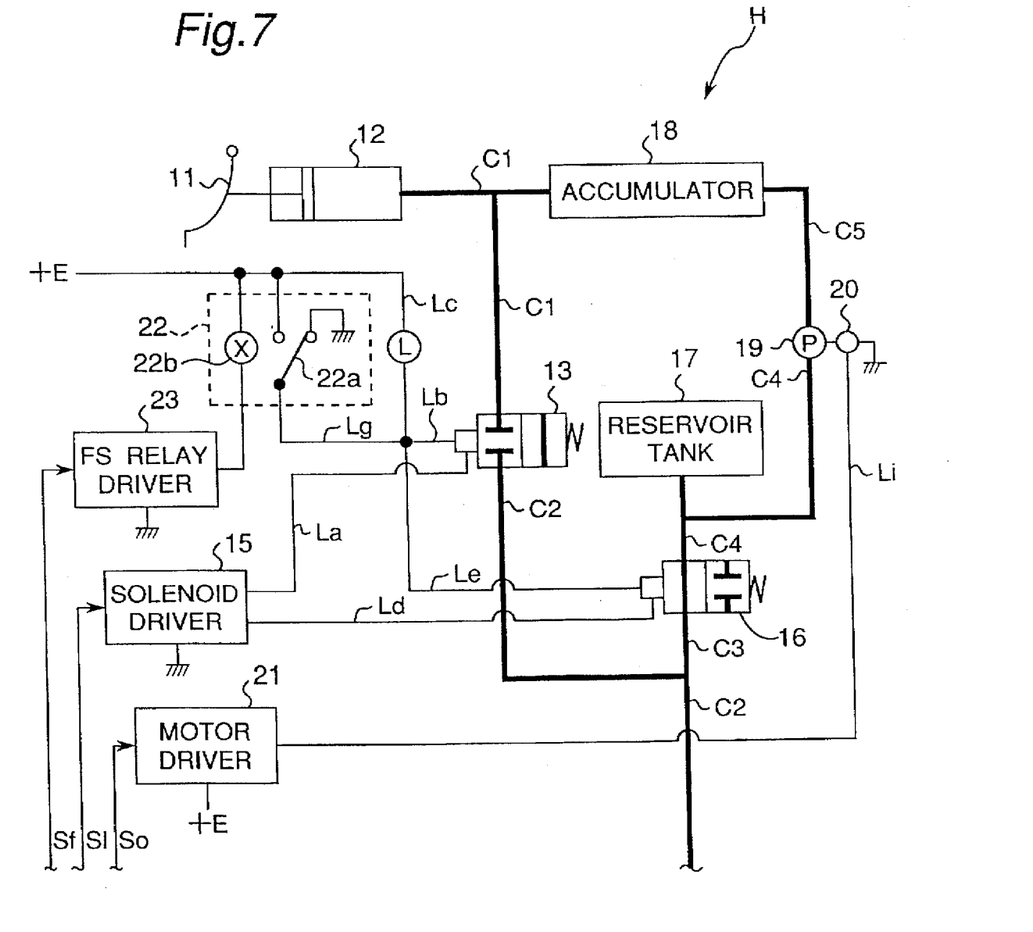
FIG. 7 is a block diagram showing the hydraulic system of FIG. 1 when the braking pressure is reduced by the anti-lock brake controller.

The fail safe relay driver 23 has an input terminal connected to the anti-lock brake controller C for receiving the fail safe signal Sf therefrom. On receipt of the fail safe signal Sf, the fail safe relay driver 23 connects the line Lh to the ground for passing the current from the source +E to energize the electromagnet 22b. The energized electromagnet 22b actuates the select switch 22a to leave from the line Lc to the line Lg for grounding thereof. In FIG. 7, shown is the moment when the select switch 22a is ground during the brake pressure reducing operation by the anti-lock control. Thus, the second route is broken.

In this case, since almost all the amount of the current flowing the first route is consumed by the lamp L, only too little energizing current to slide the spool is supplied to the solenoids SOL1 and SOL2. As a result, the control valves 13 and 16 do not operate even when the solenoid signal Sl is HIGH.

The motor driver 21 has an input terminal connected to the anti-lock brake controller C for receiving the fluid circulation signal So, and has an output terminal connected to an input terminal of motor 20 by a line Li. When the fluid circulation signal So is HIGH, the motor driver 21 connects the line Li to the power source +E to drive the motor 20.

Figure 2:
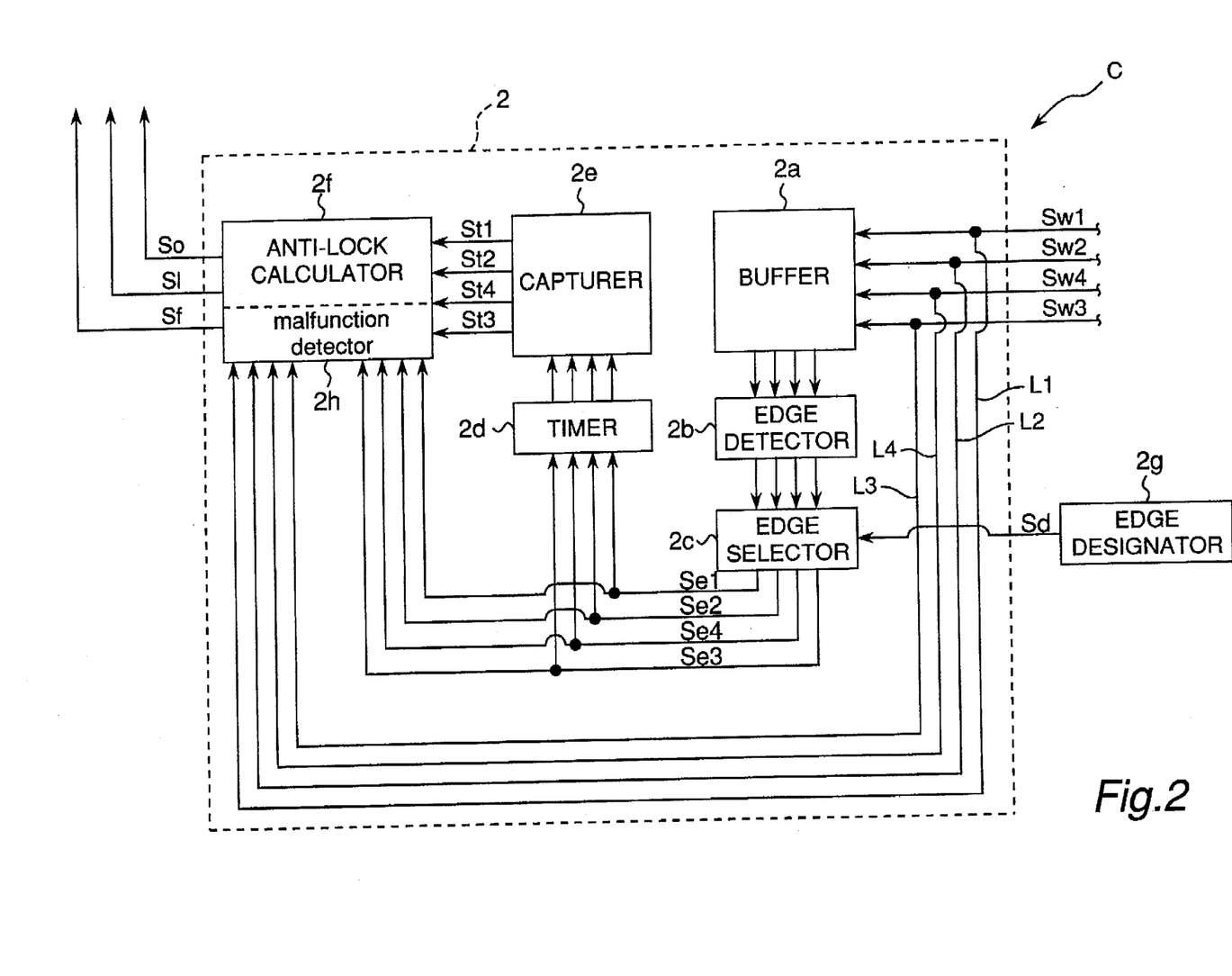
FIG. 2 is a block diagram showing the anti-lock brake controller of FIG. 1, wherein an anti-lock calculator trouble detection apparatus according to a first embodiment of the present invention is incorporated.

Referring to FIG. 2, the anti-lock brake controller C is shown. The anti-lock brake controller C includes an anti-lock control unit 2 that is comprised of a buffer storage 2a, an edge detector 2b, an edge selector 2c, a timer 2d, a capturer 2e, and an anti-lock calculator 2f.

The buffer storage 2a is connected to the I/O 1 (FIG. 1) for receiving the wheel speed signals Sw1, Sw2, Sw3, and Sw4 therefrom to latch thereof. The edge detector 2b is connected to the buffer storage 2a for receiving thus latched wheel speed signals Sw1, Sw2, Sw3, and Sw4 to detect both or either of leading edges and trailing edges thereof.

The edge selector 2c is connected to the edge detector 2b for receiving data indicative of the detected edges of signals Sw1, Sw2, Sw3, and Sw4 therefrom. Among thus detected edges, the edge selector 2c selectively detects only either leading edges and trailing edges based on an edge designation signal Sd produced by an edge designator 2g provided externally. With respect to each of wheel speed signals Sw1, Sw2, Sw3, and Sw4 that are pulse signals, the edge selector 2c produces edge selection signals Se1, Se2, Se3, and Se4, respectively, every time when the edge designated by the signal Sd is detected.

The timer 2d is connected to the edge selector 2c for receiving the edge selection signal Se1, Se2, Se3, and Se4 therefrom. Based on the edge selection signal Se1, the timer 2d detects each time when designated edge is detected with respect to wheel speed signal Sw1. Similarly, based on each of edge selection signals Se2, Se3, and Se4, the timer 2d detects times when designated edges are detected with respect to wheel speed signals Sw2, Sw3, and Sw4, respectively. Thus, on detection of such designated edges, the timer 2d further produces edge detection time signals with respect to respective signals Se1, Se2, Se3, and Se4.

The capturer 2e is connected to the timer 2d for receiving the edge detection time signals therefrom. Based on the edge detection time signal with respect to the signal Se1, the capturer 2e produces a time signal St1 indicative of such designated edge detection time. Similarly, based on each of edge selection time signals with respect to the signals Se2, Se3, and Se4, the capturer 2e produces time signals St2, St3, and St4 indicative of such designated edge detection time, respectively.

The anti-lock calculator 2f is connected to the edge selector 2c, for receiving the edge selection signals Se1, Se2, Se3, and Se4 therefrom as interrupt request signals, and to the capturer 2e for receiving the captured time signals St1, St2, St3, and St4 therefrom. The anti-lock calculator 2f is further connected to the I/O 1 by lines L1, L2, L3, and L4 for receiving the wheel speed signals Sw1, Sw2, Sw3, and Sw4 therethrough, respectively. It is to be noted that signals Sw1, Se1, and St1 are generated based on the rotating condition of wheel W1. Similarly, each group of signals Sw2, Se2, and St2 are produced based on the rotation of wheel W2; signals Sw3, Se3, and St3 are based on the wheel W3; and signals Sw4, Se4, and St4 are based on the wheel W4.

On receipt of each of interrupt request signals Se1, Se2, Se3, and Se4, the anti-lock calculator 2f suspends current operations and transfers control thereof to a routine for detecting the locked condition of any of four wheels W1, W2, W3, and W4 corresponding to the received request signal. For example, the interrupt request signal Se1 is received, the rotating speed of the wheel W1 is calculated in the method as described below for the sake of wheel locked condition detection.

Based on each group of time and edge selection signals corresponding to each of wheels W1, W2, W3, and W4, the anti-lock calculator 2f calculates actual wheel speeds V1, V2, V3, and V4 indicating the actual speed of wheels W1, W2, W3, and W4, respectively. Furthermore, according to these calculated actual wheel speeds V1, V2, V3, and V4, the anti-lock calculator 2f detects the locking state wheels as follows.

For example, the anti-lock calculator 2f calculates an average value of the greatest and the second greatest ones of these four actual wheel speeds V1, V2, V3, and V4, and obtains a control reference speed Vs used as a reference velocity for the anti-lock brake control operation. When any of actual wheel speeds V1, V2, V3, and V4 is less than the reference speed Vs by more than a predetermined value, it is judged that the corresponding wheel is locked. According to thus detected locking condition of wheel(s), the anti-lock calculator 2f determines the proper operations of the hydraulic system Hs suitable for such detected locked condition. Then, the calculator 2f further produces the lock detection signal Sl and fluid circulation signal So corresponding to thus determined proper operations.

The anti-lock controller C operates as follows. When the hydraulic system in the state shown in FIG. 1, pressing down the brake pedal 11 causes the brake fluid in the fluid pressure source side to flow toward the brake cylinders B1, B2, B3, and B4 passing through the valve 13. Then, each brake cylinder increases the braking pressure to reduce the rotation of wheel, so that the vehicle V is braked. When it is detected that any of wheels W1, W2, W3, and W4 is locked, the anti-lock calculator 2f changes the lock detection signal Sl to "HIGH".

On receipt of this HIGH level signal Sl, the solenoid driver 15 energizes solenoids SOL1 and SOL2 with the electric power +E. The pressure valve 13 closes the brake fluid supply path extending from the fluid pressure source. The pressure control valve 16 opens the fluid discharge path extending from the brake cylinders to the accumulator 18. As a result, the brake fluid in the brake cylinders B1, B2, B3, and B4 flows into the reservoir tank 17, and the brake fluid pressure therein reduces.

As the brake fluid pressure reduction starts, the anti-lock calculator 2f changes the circulation signal So to "HIGH".

On receipt of this HIGH level signal So, the motor driver 21 connects the line Li to the power source +E so that the motor 30 drives the pump 31 to suck the brake fluid in the brake cylinders B1, B2, B3, and B4 and the reservoir tank 17. Furthermore, the pump 19 further returns the sucked brake fluid to the fluid supply side. Thus, the brake fluid is circulated inside the hydraulic system HS.

However, when the wheel speed indicative of a locking symptom is improved by this fluid pressure reduction, the difference between the reference speed and the actual wheel speed(s) becomes smaller than the predetermined value. In this case, the anti-lock brake controller C judges that the wheel(s) is released from the locked state, and turns the solenoid signal Sl to "LOW" level. On receipt of this "LOW" level signal Sl, the solenoid driver 15 disconnects the solenoids SOL1 and SOL2 from the ground. As a result, the power supply from the source +E to the solenoids SOL1 and SOL2 is shut, and the pressure control valves 13 and 17 return to the normal positions (FIG. 1) from the pressure reducing position (as shown in FIG. 7 only for the hydraulic system H). Then, the hydraulic system HS is ready for increasing the brake pressure by pressing the brake pedal 11.

According to the anti-lock (skid) brake control system using a micro computer such as the anti-lock calculator 2f especially, it is necessary to cancel the anti-lock brake control when the micro computer is out of order and is in no condition to perform its function properly such as in a thermally run away. In such occasions, it is impossible to perform the anti skid brake control properly. To make matters worse, the driver in the vehicle under the control of such a disordered computer put his life in hazard.

Therefore, a fail safe system is provided for preventing a vehicle driver from being in such a hazardous situation. The fail safe system includes a malfunction detector incorporated in the anti-lock calculator 2f for detecting the malfunction of thereof, the fail safe relay 22 for breaking the second route, and the fail safe relay driver 23 for actuating the fail safe relay 22 based on the fail safe signal Sf. When the fail safe signal Sf is "HIGH", the second power route is broken regardless of the solenoid signal So, as described above. As a result, the solenoids SOL1 and SOL2 are kept from being energized by the source power +E, even when the signal Sl is "HIGH". Thus, the braking pressure generated by the driver with the pedal 11 can be transferred to the break cylinders B1, B2, B3, and B4.

For detecting such malfunctioning of the anti-lock calculator 2f, a malfunction detector 2h is provided, preferably inside the calculator 2f. The malfunction detector 2h according to this embodiment performs various operations according to signals produced by the other units 1, 2c, and 2e, and detects the malfunction of thereof by a software stored in the anti-lock calculator 2f. This malfunction detecting operation will be described below.

Figure 3:
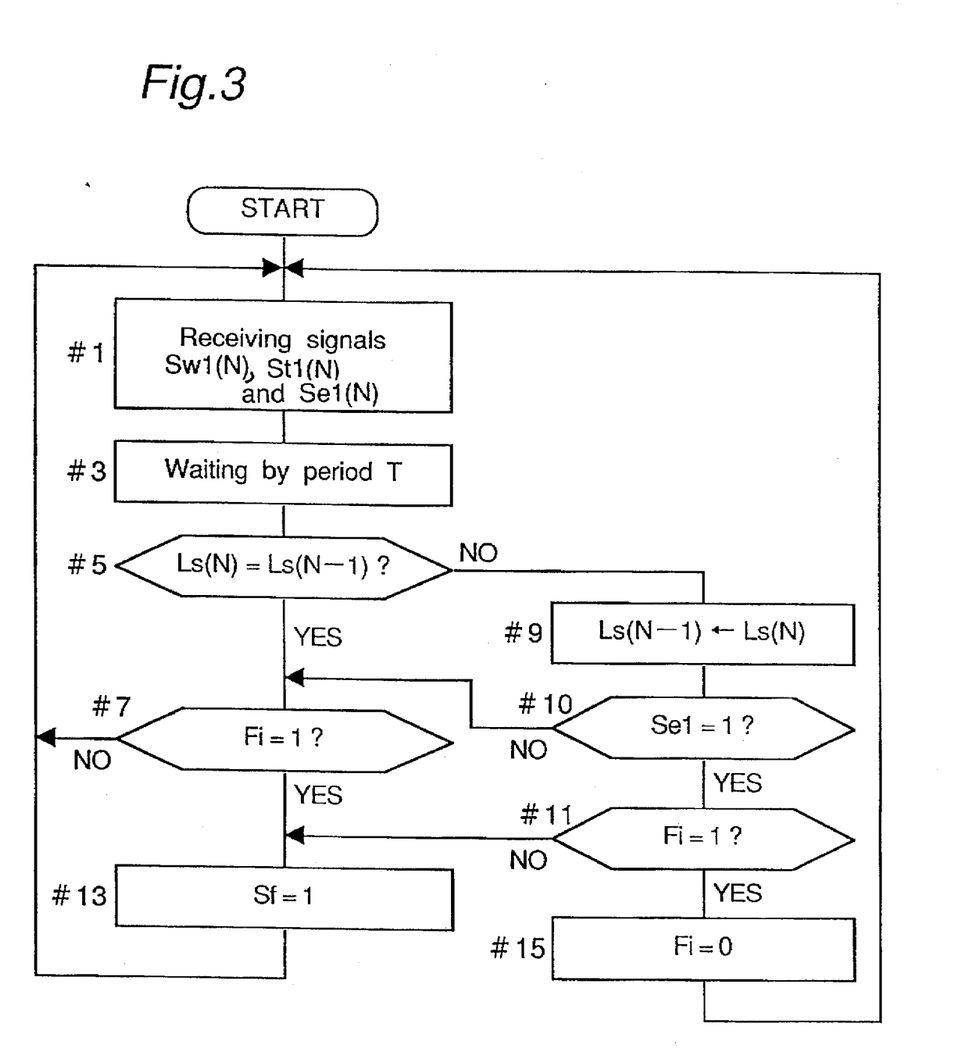
FIG. 3 is a flow chart showing an operation of the anti-lock control computer malfunction detecting device of FIG. 2.

Referring to FIG. 3, an operation by the malfunction detector 2h of FIG. 2 is shown. It is to be noted that the malfunction detection is performed with respect to each of wheels W1, W2, W3, and W4 individually. Therefore, the malfunction detection with respect to the wheel W1 at the N-th detection cycle by the malfunction detector 2h is typically described below. Note that "N" is an integer.

At step #1, the signals Sw1, Se1, and St1 are taken into the malfunction detector 2h from the I/O 1, the edge selector 2c, and the capturer 2e, respectively. Hereafter, the signals Sw1, Se1, and St1 are represented with suffix indicating the current (N-th) cycle, such as the signals Sw1(N), Se1(N), and St1(N) for the sake of better recognition.

At step #3, a predetermined period T is passed, the procedure advances to the next step #9. This period T corresponds to a period necessary for the anti-lock calculator 2f to interrupt current operations and transfer control to the locked condition detecting routine on receipt of an interrupt request signal. Thus, the period T is suitably determined according to the micro computer used in the anti-lock calculator 2. For example, usually the period T is set to some tens micro seconds.

It is to be noted that the level of those signals Sw1, Se1, and St1 is employed as the interrupt request signal. For example, the HIGH level of signal Se1(N) is used as the interrupt request signal in this case. When the interrupt request is made by such signals Se1 therefore, the anti-lock calculator 2f already has produced an interrupt signal indicating that the calculator 2f is just executing the interrupt routine after passing the period T. Then, an interrupt flag Fi is set to "1".

However, when the interrupt request is not made by signals Se1, the interrupt flag Fi is not set and remains as "0".

At step #5, it is judged whether each signal level L at the current cycle (N) of signal Sw1 is the same as the signal level at the previous cycle (N−1), respectively. This is typically depicted as "Ls(N)=Ls(N−1)?" in the flow chart of FIG. 3. When it is judged "YES", the procedure advances to next step #7. However, when it is "NO", the procedure advances to step #9.

At step #7, it is judged whether the interrupt flag Fi is set to "1" or not. When it is YES, meaning that the anti-lock calculator 2f is in the locked condition detecting routine, the procedure advances to step #13.

At step #13, the fail safe signal Sf is turned to "HIGH" level ("1") for canceling pressure reducing operation of the hydraulic system HS by the anti-lock control system for the safe driving of vehicle V.

However, when it is "NO" at step #7, meaning that the anti-lock calculator 2f is not interrupted. Then, the procedure returns to step #1.

At step #9, the current signal level Ls(N) is set to the previous signal level Ls (N−1). This is typically depicted as "Ls(N−1)←Ls(N)" in FIG. 3. Then, the procedure advances to step #11.

At step #11, it is judged whether the interrupt flag Fi is set to "1" or not. When it is YES, the procedure advances to step #15. However, when it is "NO", the procedure advances to step #13.

At step #15, the interrupt flag Fi is reset to "0" after calculating the vehicle speed V based on signal St, and the procedure returns to step #1.

Figure 4:
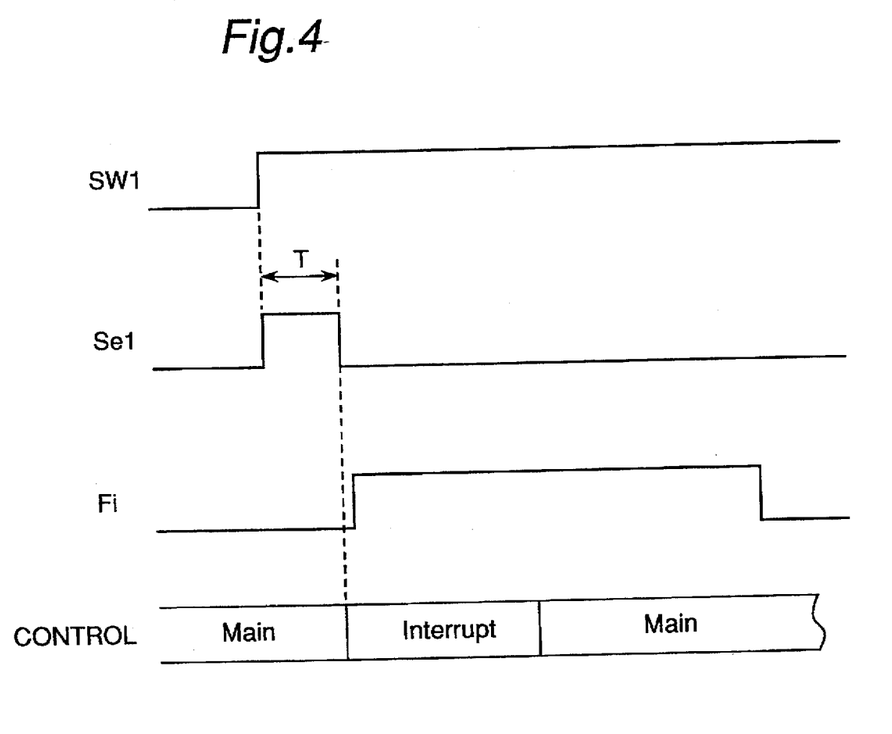
FIG. 4 is a graph showing various signals observed in the anti-lock brake controller of FIG. 2.

Referring to FIG. 4, the relationship between the pulse signal Sw1, edge selection signal Se1, and the interrupt flag Fi with respect to the control routine of the anti-lock calculator 2f is shown. In this example, the leading edge of the pulse signal Sw1 is selected by the edged designator 2g. Therefore, the waiting period T after leading edge of the edge selection signal Se1 that is the interrupt request signal, the anti-lock calculator 2f interrupts the operation from the main to interrupt routine, and sets the interrupt flag Fi.

Figure 5:
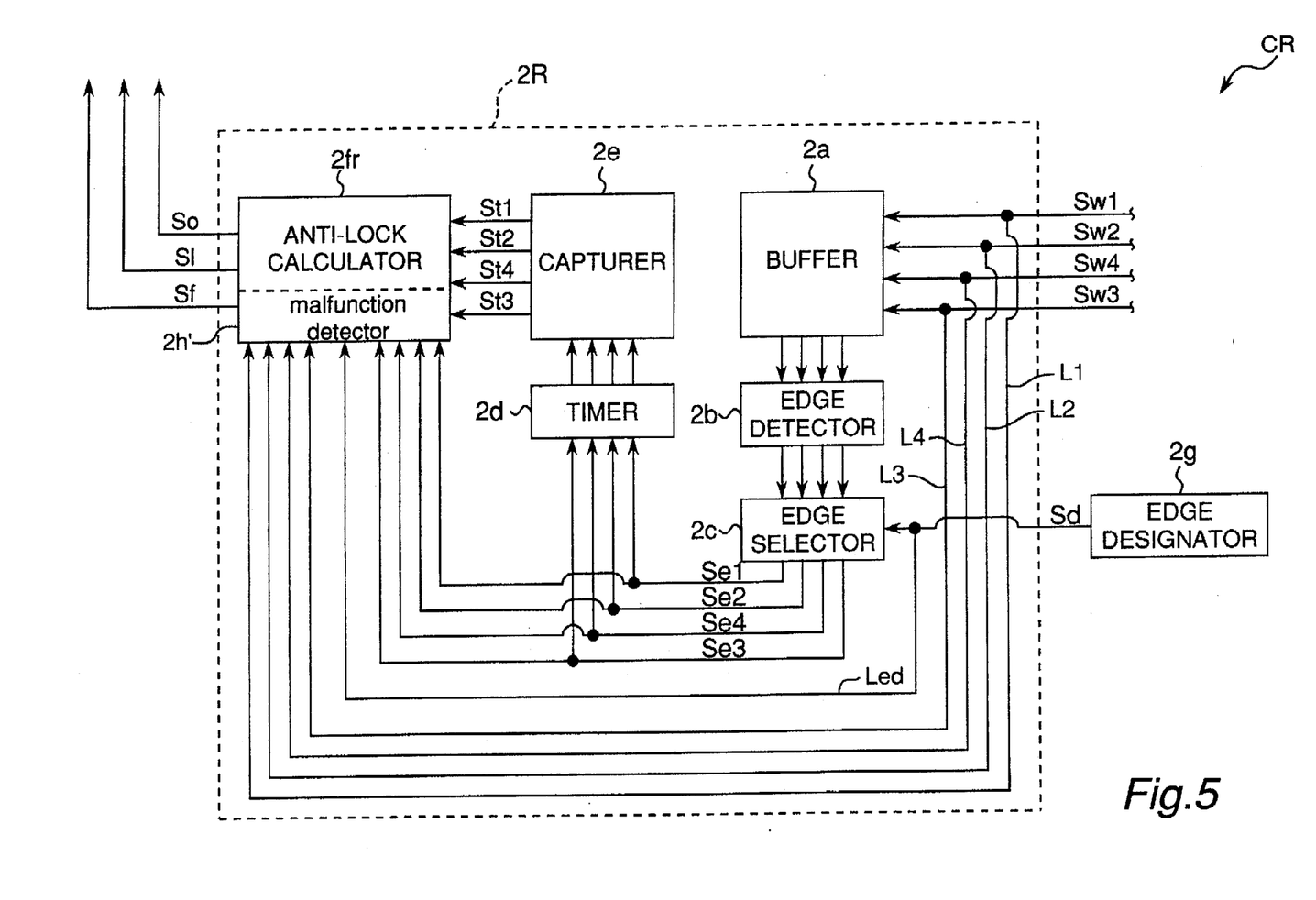
FIG. 5 is a block diagram showing an alternative of the anti-lock brake controller of FIG. 2, wherein an alternative anti-lock control computer malfunction detecting device is incorporated.

Referring to FIG. 5, an anti-lock controller of FIG. 2 is shown. This anti-lock controller CR has a modified malfunction detector 2h' incorporated in an anti-lock control unit 2R (an anti-lock calculator 2fr) is shown. This modified anti-lock control unit 2R has an additional signal line connecting between the edge designator 2g and the anti-lock calculator 2fr. Thus, the edge selection signal sd is supplied both to the selector 2c and calculator 2fr.

Figure 6:
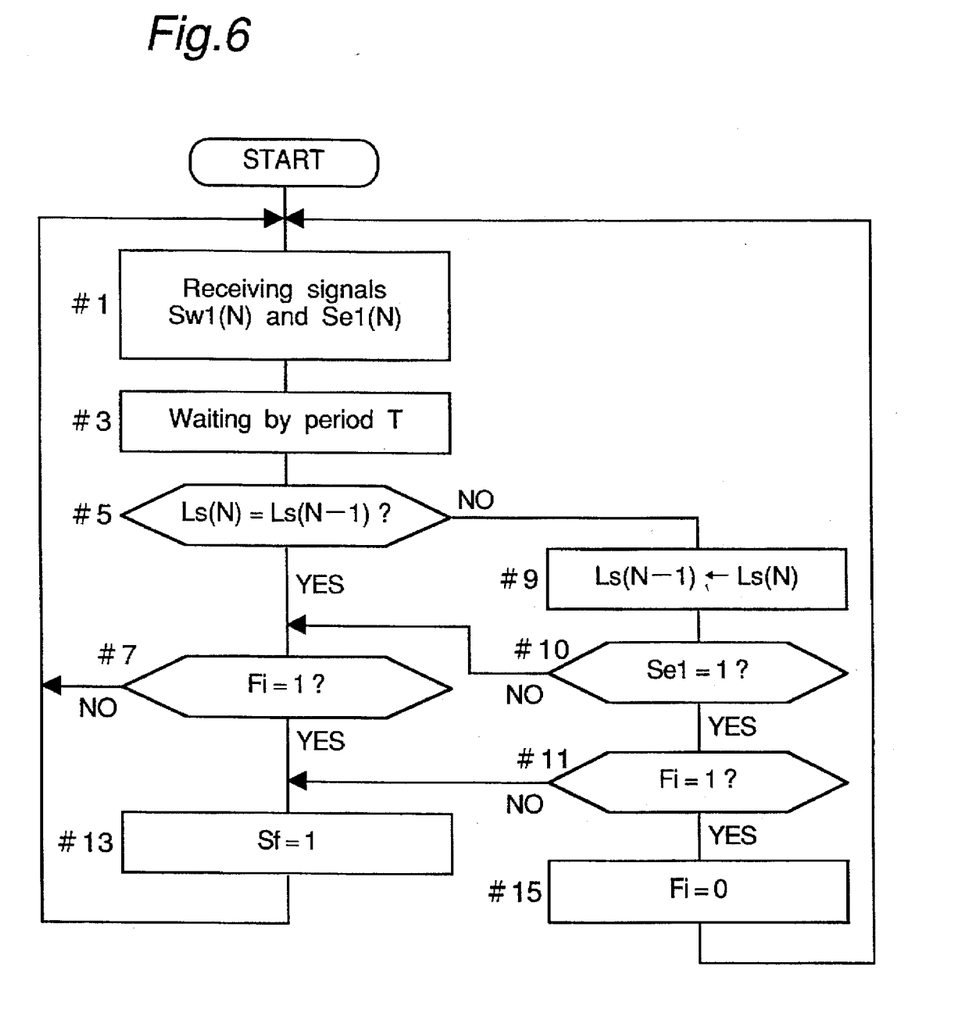
FIG. 6 is a flow chart showing an operation of the anti-lock control computer malfunction detecting device of FIG. 5.

Referring to FIG. 6, an operation by the malfunction detector 2h' of FIG. 5 is shown. This flaw chart is substantially the same as that of FIG. 3 except that an additional step #10 is inserted between steps #9 and 11. Therefore, the operation after step #9 is as follows.

At step #10, it is judged whether the interrupt request signal Se1 is HIGH, or not. It is "NO", meaning that the detected edge (leading edge) of the interrupt request signal Se1 is different from the designated edge. In this example, the trailing edge is the designated by the edge designation signal Sd from the edge designator 2g. Then, the control advances to step #7. At step #7, the presence of such a malfunction that the calculator 2f may perform the locked condition detecting routine in spite of that the interrupt request signal Se1 has the un-designated edge (leading edge in this case).

However, when it is "YES" at step #10, the procedure advances to the next step #11. Thus, the presence of such a malfunction that the calculator 2f may not perform the locked condition detecting routine in spite of that the situation requests is examined.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An anti-lock controller for detecting a locked condition of at least one wheel of a vehicle based on a pulse signal indicating a rotating speed of said wheel, said controller comprising:

buffer storage means for receiving and storing said pulse signal;

edge detection means for detecting edges of said stored pulse signal;

timer means for detecting a time when said edge detection means detects edges of said stored pulse signal;

interrupt detection means for receiving said pulse signal received by said buffer storage means, said interrupt detection means producing an interrupt signal upon receipt of said pulse signal and inputting said interrupt signal to said anti-lock controller, said anti-lock controller executing a routine for detecting the locked condition of said wheel upon receipt of said interrupt signal; and malfunction determination means for determining that said anti-lock controller malfunctions when said interrupt signal is absent with a detection of said pulse signal.

2. An anti-lock controller as claimed in claim 1, further comprising:

edge selection means for selectively detecting designated edges of said detected edges to produce a designated edge detection signal, said timer means detecting a time when said edge detection means detects each of said designated edges based on said designated edge detection signal;

capture means for capturing said detected times; and computer means for producing an interrupt signal on receipt of said pulse signal to execute a routine for detecting the rotating speed of said wheel to determine said wheel locked condition.

3. The anti-lock controller according to claim 1, said malfunction determination means individually determines that a malfunction exists with respect to each wheel of the vehicle.

4. The anti-lock controller according to claim 1, further comprising fail safe signal generating means for generating a fail safe signal for preventing said anti-lock controller from reducing a braking pressure applied to a wheel when said malfunction determination means determines existence of said malfunction.

5. The anti-lock controller according to claim 1, said malfunction determination means outputting a signal to cancel a pressure reducing operation of a hydraulic system controlled by said anti-lock controller when a malfunction is determined to exist.

6. A malfunction detection device for detecting a malfunction of an anti-lock control computation means for use in an anti-lock control system to detect a locked condition in which at least one wheel of a vehicle is locked based on a pulse signal indicating a rotating speed of said wheel, said anti-lock control computation means comprising:

buffer storage means for receiving and storing said pulse signal;

edge detection means for detecting edges of said stored pulse signal;

edge selection means for selectively detecting designated edges of said detected edges to produce a designated edge detection signal;

timer means for detecting a time when said edge detection means detects each of said designated edges based on said designated edge detection signal;

capture means for capturing said detected times; and computer means for producing an interrupt signal on receipt of said pulse signal to execute a routine for detecting the rotating speed of said wheel to determine said wheel locked condition, said malfunction detection device comprising:

interrupt detection means for detecting said pulse signal being received by said buffer storage means; and malfunction determination means for determining that any of said buffer storage means, edge detection means, edge selection means, timer means, and capture means malfunctions when said interrupt signal is absent and said pulse signal being received by said buffer storage means is detected.

7. A malfunction detection device as claimed in claim 6, further comprising fail safe signal generating means for generating a fail safe signal for preventing said anti-lock control system from reducing a braking pressure applied to said wheel when said malfunction determination means determines existence of said malfunction.

8. A malfunction detection device as claimed in claim 6, wherein said malfunction determination means determines that any of said buffer storage means, edge detection means, edge selection means, timer means, and capture means malfunctions when said interrupt signal is present and said pulse signal being received by said buffer storage means is detected.

9. A malfunction detection device as claimed in claim 6, wherein said interrupt detection means detects said pulse signal being received by said computer means; and said malfunction determination means determines that any of said buffer storage means, edge detection means, edge selection means, timer means, and capture means malfunctions when said interrupt signal is present but without a detection of said pulse signal being received by said computer means.

10. A malfunction detection device as claimed in claim 6, said interrupt detection means further detecting said designated edge detection signal; and said malfunction determination means for determining that any of said buffer storage means, edge detection means, edge selection means, timer means, and capture means malfunctions when said interrupt signal is absent and said designated edge detection signal is detected.

11. A malfunction detection device as claimed in claim 6, wherein said interrupt detection means further detecting said designated edge detection signal; and said malfunction determination means for determining that any of said buffer storage means, edge selection means, edge detection means, timer means, and capture means malfunctions when said interrupt signal is present without a detection of said designated edge detection signal but on the detection of edges of said stored pulse signal.

12. The malfunction detection device according to claim 6, said malfunction determination means individually determines that a malfunction exists with respect to each wheel of the vehicle.

13. A malfunction detection device for detecting a malfunction of an anti-lock control mechanism of an anti-lock control system to detect a locked condition in which at least one wheel of a vehicle is locked based on a pulse signal indicating a rotating speed of the wheel, said anti-lock control mechanism comprising:

a buffer storage that receives and stores said pulse signal;

an edge detector that detects at least one edge of said stored pulse signal;

an edge selector that selectively detects designated edges of said detected edges to produce a designated edge detection signal;

a timer that detects a time when said edge detector detects each of said designated edges based on said designated edge detection signal and outputs an edge detection time signal;

a capture device that receives said edge detector time signal and outputs a time signal; and a computer that produces an interrupt signal on receipt of said time signal to detect the rotating speed of the wheel to determine said wheel locked condition;

said malfunction detection device comprising:

an interrupt detector that detects receipt of said pulse signal by said buffer storage; and a malfunction determinator that determines that any of said buffer storage, edge detector, edge selector, timer, and capture device malfunctions when said interrupt signal is absent and said pulse signal received by said buffer storage is detected.

14. The malfunction detection device according to claim 13, further comprising a fail safe signal generator that generates a fail safe signal for preventing said anti-lock control system from reducing a braking pressure applied to said wheel when said malfunction determinator determines existence of said malfunction.

15. The malfunction detection device according to claim 13, wherein said malfunction determinator determines that any of said buffer storage, edge detector, edge selector, timer, and capture device malfunctions when said interrupt signal is present and said pulse signal being received by said buffer storage is detected.

16. The malfunction detection device according to claim 13, wherein said interrupt detector detects said pulse signal being received by said computer; and said malfunction determinator determines that any of said buffer storage, edge detector, edge selector, timer, and capture device malfunctions when said interrupt signal is present without a detection of said pulse signal being received by said computer.

17. The malfunction detection device according to claim 13, wherein said interrupt detector detects said designated edge detection signal; and said malfunction determinator determines that any of said buffer storage, edge detector, edge selector, timer, and capture devices malfunctions when said interrupt signal is absent and said designated edge detection signal is detected.

18. The malfunction detection device according to claim 13, wherein said interrupt detector further detects said designated edge detection signal; and said malfunction determinator determines that any of said buffer storage, edge detector, edge selector, timer, and capture device malfunctions when said interrupt signal is present said designated edge detection signal is detected, and edges of said stored pulse signal are detected.

19. The malfunction detection device according to claim 13, said malfunction determinator individually determines that a malfunction exists with respect to each wheel of the vehicle.

* * * * *